US012610877B2

(12) United States Patent
Schroeder

(10) Patent No.: US 12,610,877 B2
(45) Date of Patent: Apr. 28, 2026

(54) AGRICULTURAL SYSTEM AND METHOD FOR DETERMINING A TRIP MAGNITUDE OF A GROUND ENGAGING TOOL OF AN AGRICULTURAL IMPLEMENT

(71) Applicant: CNH Industrial America LLC, New Holland, PA (US)

(72) Inventor: Brittany Schroeder, Lowell, IN (US)

(73) Assignee: CNH Industrial America LLC, New Holland, PA (US)

( * ) Notice: Subject to any disclaimer, the term of this patent is extended or adjusted under 35 U.S.C. 154(b) by 756 days.

(21) Appl. No.: 17/533,464

(22) Filed: Nov. 23, 2021

(65) Prior Publication Data

US 2023/0157197 A1     May 25, 2023

(51) Int. Cl.
| | |
|---|---|
| *A01B 61/04* | (2006.01) |
| *A01B 35/06* | (2006.01) |
| *A01B 35/24* | (2006.01) |
| *A01B 79/00* | (2006.01) |

(52) U.S. Cl.
CPC ............ *A01B 61/046* (2013.01); *A01B 35/06* (2013.01); *A01B 35/24* (2013.01); *A01B 79/005* (2013.01)

(58) Field of Classification Search
CPC ..... A01B 61/046; A01B 79/005; A01B 35/06; A01B 35/24; A01B 35/22
See application file for complete search history.

(56) References Cited

U.S. PATENT DOCUMENTS

| | | | |
|---|---|---|---|
| 4,159,474 A | | 6/1979 | Wooldridge |
| 4,266,616 A | * | 5/1981 | Mueller, Jr. ......... A01B 63/112 |
| | | | 172/7 |
| 4,271,910 A | * | 6/1981 | Schafer ................ A01B 63/112 |
| | | | 172/430 |
| 6,250,398 B1 | | 6/2001 | Zaun et al. |
| 8,827,001 B2 | | 9/2014 | Wendte et al. |
| 2017/0196160 A1 | | 7/2017 | Bjerketvedt et al. |
| 2018/0310466 A1 | | 11/2018 | Kovach et al. |

(Continued)

FOREIGN PATENT DOCUMENTS

| | | |
|---|---|---|
| CN | 108377676 A | 8/2018 |

OTHER PUBLICATIONS

"Shear Bolt Monitor", Farm Show Magazine, vol. 42, Issue #2, p. 24, 2018, 4 pages.

*Primary Examiner* — Christopher J Sebesta
*Assistant Examiner* — Joel F. Mitchell
(74) *Attorney, Agent, or Firm* — Dority & Manning, P.A.

(57)     ABSTRACT

A system for automatically determining a trip magnitude of a ground engaging tool of an agricultural implement includes a ground-engaging system having an attachment structure coupled to a frame of an agricultural implement, a ground-engaging tool rotatably coupled to the attachment structure at a joint, and a biasing element configured to bias the ground-engaging tool towards a predetermined ground-engaging position. The system further includes a trip sensor configured to generate data indicative of a magnitude of rotation of the ground-engaging tool, the trip sensor being at least partially received within the biasing element. Additionally, the system includes a computing system communicatively coupled to the trip sensor, the computing system being configured to determine the magnitude of rotation of the ground-engaging tool based at least in part on the data generated by the trip sensor.

17 Claims, 7 Drawing Sheets

(56)      References Cited

U.S. PATENT DOCUMENTS

| | | | |
|---|---|---|---|
| 2019/0246548 A1* | 8/2019 | Kovach et al. | ....... A01B 3/24 |
| 2020/0337202 A1* | 10/2020 | Hertzog et al. | ....... A01B 3/24 |
| 2020/0390023 A1 | 12/2020 | Harmon et al. | |
| 2021/0059098 A1 | 3/2021 | Kovach | |
| 2021/0123219 A1 | 4/2021 | Foster et al. | |
| 2021/0134090 A1* | 5/2021 | Sporrer et al. | ...... A01B 63/008 |

* cited by examiner

300

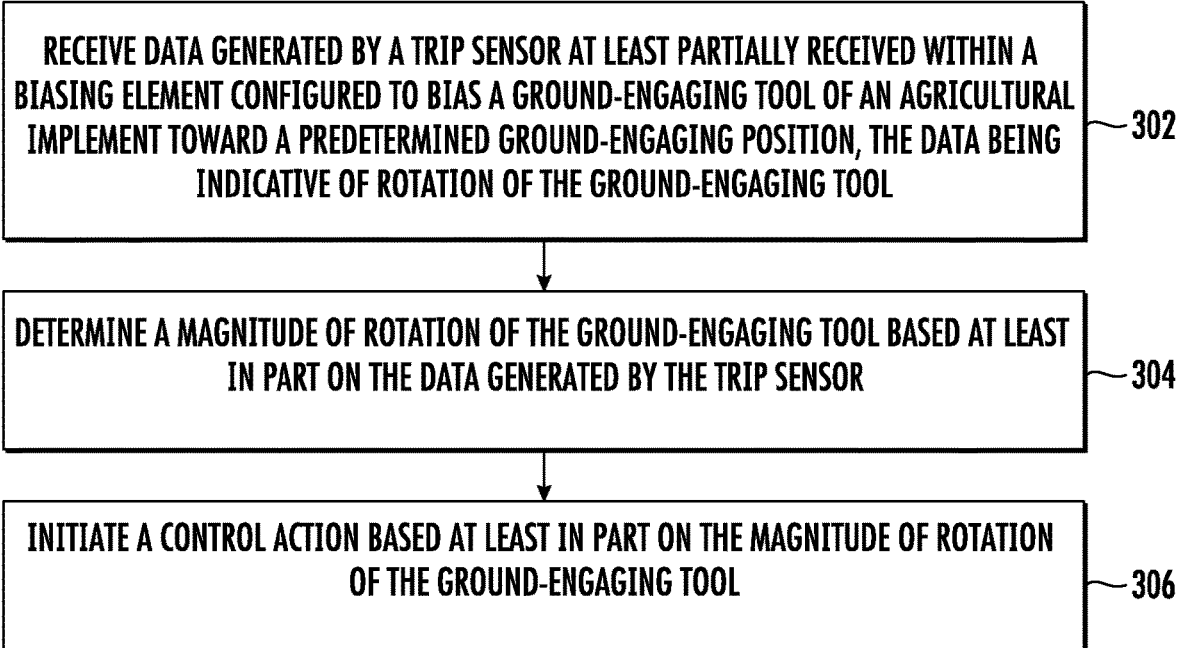

RECEIVE DATA GENERATED BY A TRIP SENSOR AT LEAST PARTIALLY RECEIVED WITHIN A BIASING ELEMENT CONFIGURED TO BIAS A GROUND-ENGAGING TOOL OF AN AGRICULTURAL IMPLEMENT TOWARD A PREDETERMINED GROUND-ENGAGING POSITION, THE DATA BEING INDICATIVE OF ROTATION OF THE GROUND-ENGAGING TOOL — 302

DETERMINE A MAGNITUDE OF ROTATION OF THE GROUND-ENGAGING TOOL BASED AT LEAST IN PART ON THE DATA GENERATED BY THE TRIP SENSOR — 304

INITIATE A CONTROL ACTION BASED AT LEAST IN PART ON THE MAGNITUDE OF ROTATION OF THE GROUND-ENGAGING TOOL — 306

FIG. 10

AGRICULTURAL SYSTEM AND METHOD FOR DETERMINING A TRIP MAGNITUDE OF A GROUND ENGAGING TOOL OF AN AGRICULTURAL IMPLEMENT

FIELD OF THE INVENTION

The present disclosure relates generally to agricultural implements and, more particularly, to systems and methods for determining a trip magnitude of a ground-engaging tool of an agricultural implement.

BACKGROUND OF THE INVENTION

It is well known that, to attain the best agricultural performance from a field, a farmer must cultivate the soil, typically by performing a tillage operation. Modern farmers perform tillage operations by pulling a tillage implement behind an agricultural work vehicle, such as a tractor. Tillage implements typically include a plurality of ground-engaging tools configured to penetrate the soil to a particular depth. In this respect, the ground-engaging tools may be rotatably coupled to a frame of the tillage implement. In many instances, biasing elements, such as springs, are used to exert biasing forces on the ground-engaging tools. This configuration may allow the ground-engaging tools to be biased towards a desired position relative to the frame, thereby maintaining the particular depth of soil penetration as the agricultural work vehicle pulls the tillage implement through the field. Additionally, this configuration may also permit the ground-engaging tools to rotate out of the way of rocks or other impediments in the soil, thereby preventing damage to the ground-engaging tools or other components on the implement.

Frequent tripping of the ground-engaging tools may result in uneven compaction mitigation. However, it is difficult for an operator to determine why a trip is occurring during a tillage operation. In some instances, knowing at least a magnitude of the trip would help identify the reason for the trips.

Accordingly, an improved agricultural system and method for determining a trip magnitude of a ground-engaging tool of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for automatically determining a trip magnitude of a ground engaging tool of an agricultural implement. The system may include a ground-engaging system having an attachment structure coupled to a frame of an agricultural implement, a ground-engaging tool rotatably coupled to the attachment structure at a joint, and a biasing element configured to bias the ground-engaging tool towards a predetermined ground-engaging position. The system may further include a trip sensor configured to generate data indicative of a magnitude of rotation of the ground-engaging tool, with the trip sensor being at least partially received within the biasing element. Additionally, the system may include a computing system communicatively coupled to the trip sensor, where the computing system is configured to determine the magnitude of rotation of the ground-engaging tool based at least in part on the data generated by the trip sensor.

In another aspect, the present subject matter is directed to a shank assembly of an agricultural implement. The shank assembly may include an attachment structure coupled to a frame of the agricultural implement, a ground-engaging tool rotatably coupled to the attachment structure at a joint, a biasing element configured to bias the ground-engaging tool towards a predetermined ground-engaging position, a trip sensor configured to generate data indicative of a magnitude of rotation of the ground-engaging tool, and a computing system communicatively coupled to the trip sensor. The trip sensor may be at least partially received within the biasing element. Additionally, the computing system may be configured to determine the magnitude of rotation of the ground-engaging tool based at least in part on the data generated by the trip sensor.

In an additional aspect, the present subject matter is directed to a method for determining a trip magnitude of a ground engaging tool of a ground-engaging system of an agricultural implement, where the ground-engaging system includes an attachment structure coupled to a frame of the agricultural implement, a ground-engaging tool rotatably coupled to the attachment structure at a joint, and a biasing element configured to bias the ground-engaging tool towards a predetermined ground-engaging position. The method may include receiving, with a computing system, data generated by a trip sensor that is indicative of a magnitude of rotation of the ground-engaging tool, and where the trip sensor is at least partially received within the biasing element. The method may further include determining, with the computing system, a magnitude of rotation of the ground-engaging tool based at least in part on the data generated by the trip sensor. Additionally, the method may include initiating, with the computing system, a control action based at least in part on the magnitude of the rotation of the ground-engaging tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 illustrates a flow diagram of one embodiment of a method for determining a trip magnitude of a ground-engaging tool of an agricultural implement in accordance with aspects of the present subject matter.

Figure 1:
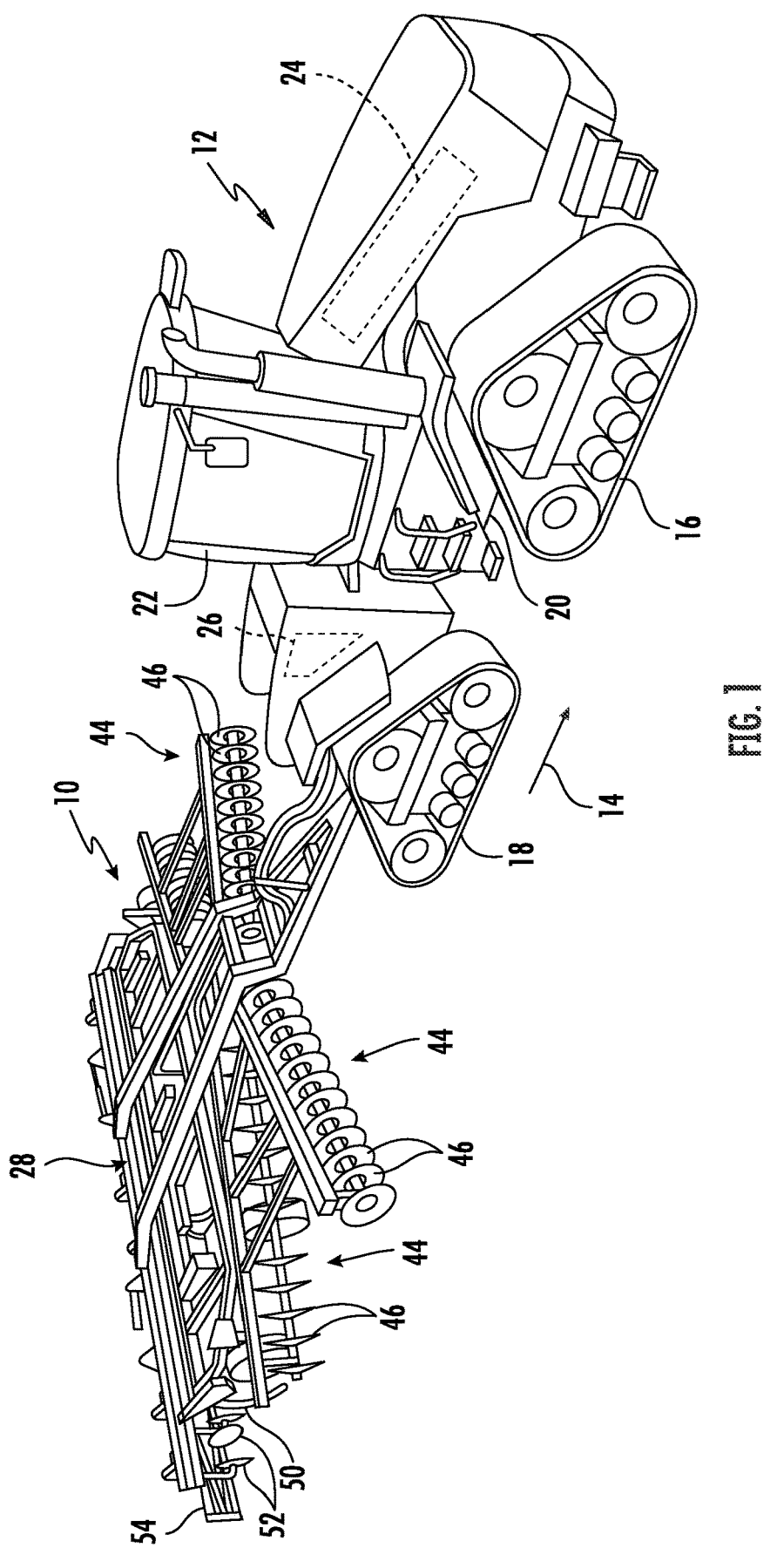
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining a trip magnitude of a ground-engaging tool of an agricultural implement. Specifically, in several embodiments, the disclosed system may be used to determine the magnitude of rotation of a ground-engaging tool of a ground-engaging system about a joint coupling the ground-engaging tool relative to a frame of an agricultural implement. For instance, the disclosed system may include a trip sensor, such as a Hall-effect sensor and magnet or a linear potentiometer, that is at least partially received within a biasing element configured to bias the ground-engaging tool towards a predetermined ground-engaging position. The trip sensor is configured to generate data indicative of a magnitude of rotation of the ground-engaging tool such that a computing system of the disclosed system may be configured to receive the data from the trip sensor and, in turn, determine a magnitude of the rotation or "trip" of the ground-engaging tool. The computing system may further be configured to initiate a control action based at least in part on the magnitude of the trip. By particularly positioning the trip sensor at least partially within the biasing element, the trip sensor is better protected from dirt and debris during an agricultural operation with the agricultural implement that may otherwise damage the sensor.

Figure 2:
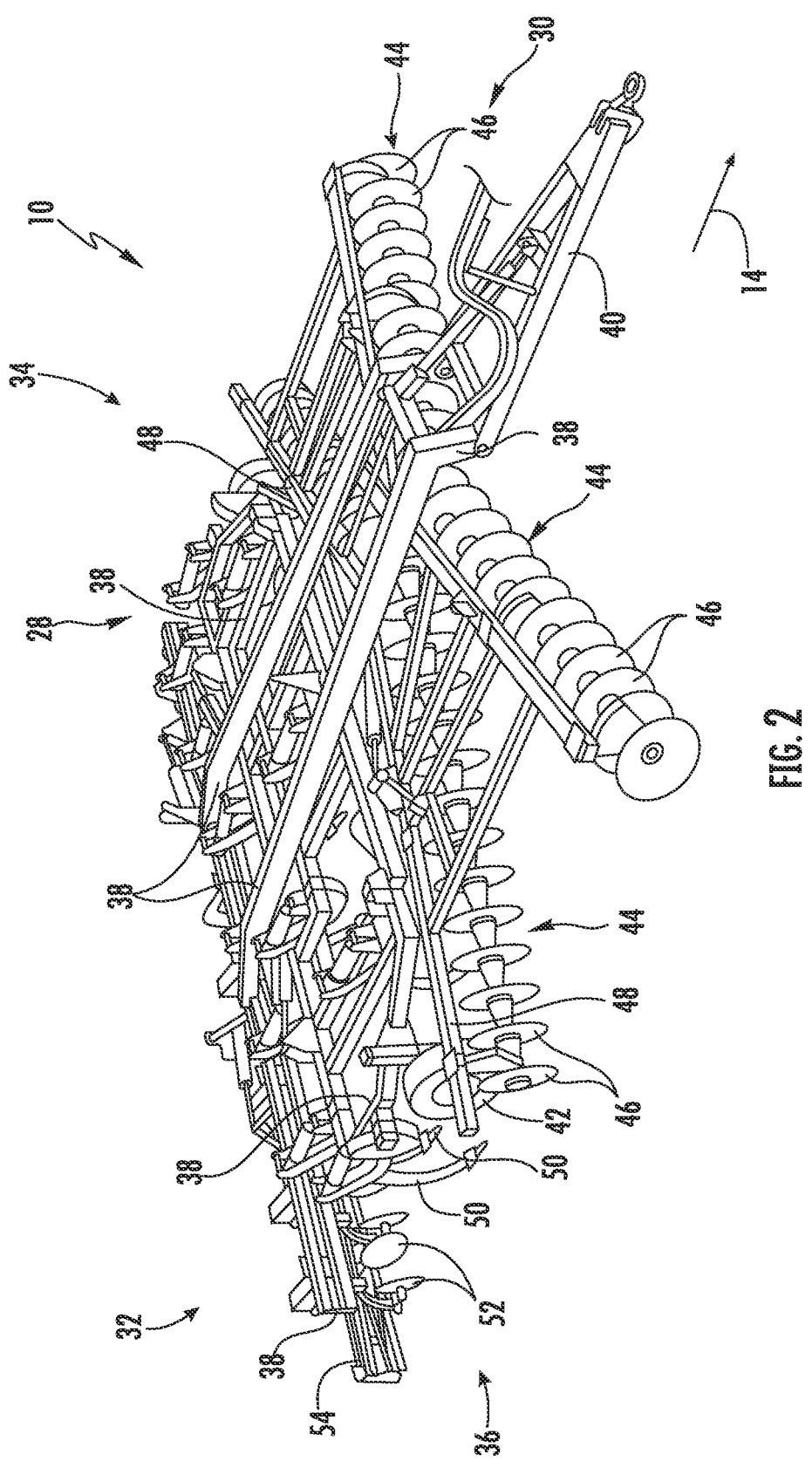
FIG. 2 illustrates another perspective view of the agricultural implement shown in FIG. 1 in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown particularly in FIG. 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one of which is shown in FIG. 2) may be coupled to the frame 28 to facilitate towing the implement 10 in the direction of travel 14.

In several embodiments, one or more ground-engaging tools may be coupled to and/or supported by the frame 28. More particularly, in certain embodiments, the ground-engaging tools may include one or more shanks 50 and/or one or more disc blades 46 supported relative to the frame 28. In one embodiment, each shank 50 and/or disc blade 46 may be individually supported relative to the frame 28. Alternatively, one or more groups or sections of the ground-engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil.

It should be appreciated that, in addition to the shanks 50 and the disc blades 46, the implement frame 28 may be configured to support any other suitable ground-engaging tools. For instance, in the illustrated embodiment, the frame 28 is also configured to support a plurality of leveling blades 52 and rolling (or crumbler) basket assemblies 54. In other embodiments, any other suitable ground-engaging tools may be coupled to and supported by the implement frame 28.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
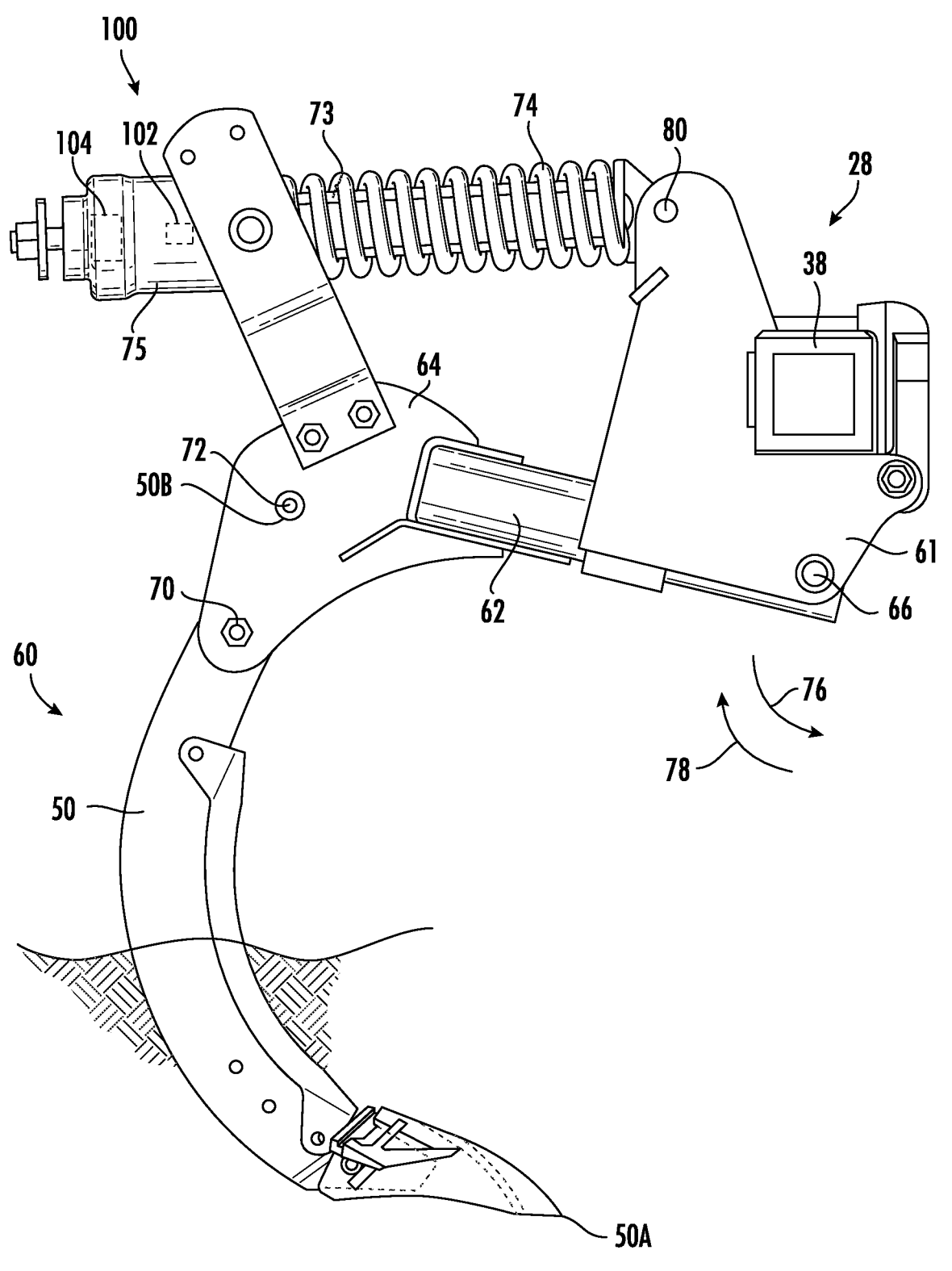
FIGS. 3 and 4 illustrate side views of one embodiment of a shank assembly including a shank rotatably coupled to an implement frame in accordance with aspects of the present subject matter, particularly illustrating the shank in a non-tripped position and a tripped-position, respectively.
Figure 4:
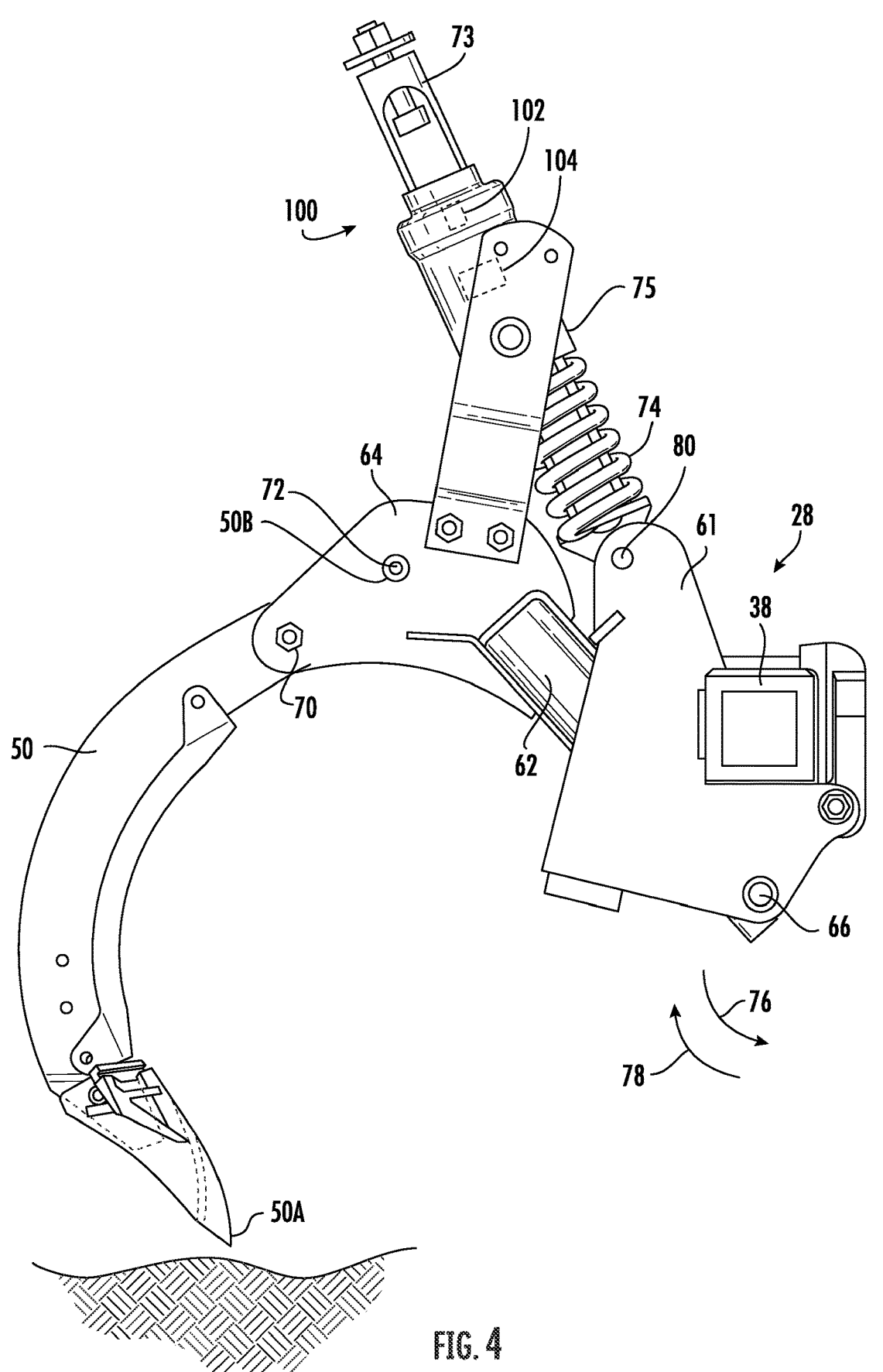

Referring now to FIGS. 3 and 4, side-views of a shank assembly including one of the shanks 50 of the tillage implement 10 described above with reference to FIGS. 1 and 2 is illustrated in accordance with aspects of the present subject matter, particularly illustrating the shank assembly in a non-tripped position in FIG. 3 and in a tripped position in FIG. 4. As shown in the illustrated embodiment, the shank assembly includes the shank 50 and an associated attachment structure 60 for rotatably coupling the shank 50 to the implement frame 28 (e.g., about a first joint 66). More particularly, the attachment structure 60 includes a first attachment member 61, a second attachment member 62, and a third attachment member 64. The first attachment member 61 is fixed to the implement frame 28 (e.g., to frame member 38). A first end of the second attachment member 62 is rotatably coupled to the first attachment member 61 at the first joint 66. The third attachment member 64 is fixed to a second end of the second attachment member 62.

The shank 50 extends between a proximal or tip end 50A and a distal end 50B, with the shank 50 being rotatably coupled to the attachment structure 60 (e.g., to the third attachment member 64) of the shank assembly at a second joint 70 proximate the distal end 50B. As such, the shank 50 may rotate about the second joint 70 relative to the frame 28 independent of the rotation about the first point 66.

Further, as shown in FIGS. 3 and 4, the shank assembly may include a shear bolt or pin 72 (hereinafter referred to as "the shear pin 72") for preventing rotation of the shank 50 about the second joint 70 during normal operation of the tillage implement. For instance, the shear pin 72 at least partially extends through both the attachment structure 60 (e.g., through third attachment member 64) and the shank 50 at a location spaced apart from the second joint 70. For example, in the illustrated embodiment, the shear pin 72 is received within openings formed above the second joint 70 in the attachment member 64 and the shank 50. However, the shear pin 72 may be positioned at any other suitable location relative to the second joint 70.

Additionally, in several embodiments, the shank assembly may include a biasing element 74 for biasing the shank 50 towards a predetermined ground-engaging tool position (FIG. 3) relative to the frame 28. In general, the shank 50 is configured to penetrate the soil to a desired depth when the shank 50 is in the predetermined ground-engaging tool position (FIG. 3). In operation, the biasing element 74 may permit relative movement between the shank 50 and the frame 28. For example, the biasing element 74 may be configured to bias the shank 50 (and the attachment structure 60) to rotate relative to the frame 28 in a first direction (e.g., as indicated by arrow 76) toward the predetermined ground-engaging tool position. The biasing element 74 also allows the shank 50 (and the attachment structure 60) to rotate away from the predetermined ground-engaging tool position (e.g., to a shallower depth of penetration or out of the ground), such as in a second direction (e.g., as indicated by arrow 78) opposite the first direction 76, toward a tripped ground-engaging tool position shown in FIG. 4, when encountering rocks or other impediments in the field.

In the embodiment shown, the biasing element 74 is configured as a coil spring. However, it should be appreciated that the biasing element 74 may be configured as any other suitable biasing element. As will be described in greater detail below, a guide 73 extends longitudinally through the coil spring 74 to limit the lateral movement of the coil spring 74 as the coil spring 74 compresses and extends. A cap 75 is slidably received on the guide 73 and is rotatably coupled to the shank 50, particularly to the third attachment member 64. The coil spring 74 is compressible between the cap 75 and the first attachment member 61. Particularly, during a tillage operation, the tip end 50A of the shank 50 may encounter impediments in the field causing the shank assembly to rotate about the first joint 66 in the second direction 78 to allow the shank assembly to clear or pass over the impediment. As the shank 50 rotates away from the predetermined ground-engaging position in FIG. 3 towards the tripped ground-engaging tool position in FIG. 4, the cap 75 slides along the guide 73 and compresses the coil spring 74. As such, the compression of the coil spring 74 is indicative of a magnitude of a trip of the shank 50. Once the impediment is cleared, to return the shank 50 to the predetermined ground-engaging position in FIG. 3, the coil spring 74 applies a spring force against the cap 75 to slide the cap 75 along the guide 73 to rotate the shank 50 back towards the predetermined ground-engaging position in FIG. 3. The spring force is a function of the compression of the coil spring 74 from a resting position associated with the predetermined ground-engaging position.

In accordance with aspects of the present subject matter, the shank assembly further includes a trip sensor 100 for monitoring tripping of the shank 50. More particularly, data from the trip sensor 100 may be used to determine a magnitude of each trip of the shank 50. For instance, in some embodiments, the trip sensor 100 may include a sensing portion 102, such as a Hall-effect sensor or a linear potentiometer, configured to generate data indicative of a compression distance of the biasing element 74, which in turn, is indicative of a magnitude of a trip event or rotation of the shank 50 about the joint 66. In such embodiments, the trip sensor 100 also includes a sensed portion 104, such as a magnet or arm, which is movable relative to the sensing portion 102. The position of the sensed portion 104 relative to the sensing portion 102 is determined by the sensing portion 102 and is indicative of the magnitude of a trip event or rotation of the shank 50 about the joint 66. One of the sensing portion 102 and the sensed portion 104 may be movable with the biasing element 74 (e.g., fixed to the cap 75 and/or the biasing element 74) as the biasing element 74 is compressed or extended, while the other of the sensing portion 102 and the sensed portion 104 may be fixed relative to the biasing element 74 (e.g., fixed to the guide 73).

Figures 5, 6, 7:
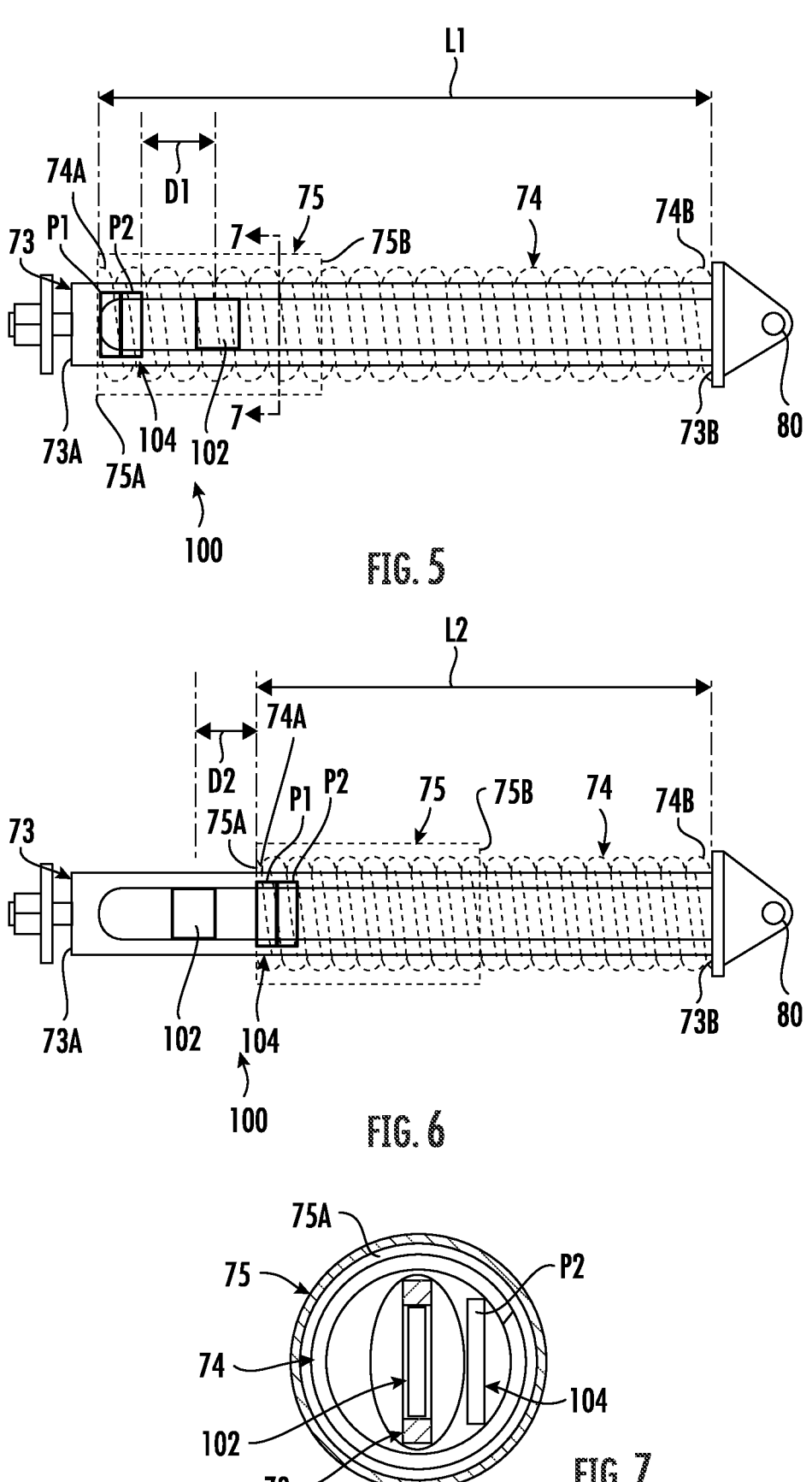
FIGS. 5 and 6 illustrate side views of one embodiment of a sensor system for determining a trip magnitude of a ground-engaging tool of an agricultural implement in accordance with aspects of the present subject matter.
FIG. 7 illustrates a section view of the sensor system taken with respect to the section line 7-7 in FIG. 5 in accordance with aspects of the present subject matter.

Referring now to FIGS. 5-7, various views of one embodiment of the trip sensor 100 for determining a trip magnitude of the shank 50 are illustrated in accordance with aspects of the present subject matter. Particularly, FIG. 5 illustrates a side view of the trip sensor 100 when the shank 50 is in the predetermined or non-tripped ground-engaging position (FIG. 3), FIG. 6 illustrates a side view of the trip sensor 100 when the shank 50 is in the tripped position (FIG. 4), and FIG. 7 illustrates a section view of the trip sensor 100 taken with respect to section line 7-7 in FIG. 5. As shown in FIGS. 5 and 6, the guide 73 generally extends longitudinally between a first guide end 73A and a second guide end 73B, with the second guide end 73B being rotatably coupled to the first attachment member 61 (FIGS. 3 and 4) at a third joint 80. The biasing element 74 similarly extends longitudinally between a first spring end 74A and a second spring end 74B. The guide 73 extends longitudinally within the biasing element 74 such that the first spring end 74A is proximate or closer to the first guide end 73A than the second guide end 73B, and the second spring end 74B is proximate or closer to the second guide end 73B than the first guide end 73A. The cap 75 also generally extends longitudinally between a first cap end 75A and a second, open cap end 75B. The cap 75 is slidably received on the guide 73, and the first spring end 74A of the biasing element 74 is positioned at the cap 75. For instance, in one embodiment, the biasing element 74 extends through the second cap end 75B of the cap 75 such that the first spring end 74A of the biasing element 74 rests against the first cap end 75A and the first cap end 75A is generally between the first guide end 73A and the first spring end 74A.

As shown in FIGS. 5-7, in one embodiment, the sensing portion 102 is fixed relative to the biasing element 74 while the sensed portion 104 (e.g., a magnet) is movable with the biasing element 74. Particularly, the sensing portion 102 is fixed to the guide 73 and the sensed portion 104 is fixed to the cap 75. By arranging the trip sensor 100 at least partially within the biasing element 74, the trip sensor 100 is protected from dirt and debris that may otherwise damage the trip sensor 100. Further, by fixing the sensing portion 102 to the guide 73, the sensing portion 102 is subject to less movement, which may reduce wear on the sensing portion 102.

When the shank 50 is in the predetermined ground-engaging position (FIG. 3), the biasing element 74 extends across a first length L1 (FIG. 5) between the first and second spring ends 74A, 74B, and the sensed portion 104 is at a first position relative to the sensing portion 102. When the shank 50 is moved to the tripped position (FIG. 4), the cap 75 slides from the first guide end 73A towards the second guide end 73B and compresses the biasing element 74 such that the biasing element 74 extends across a shorter, second length L2 (FIG. 6) between the first and second spring ends 74A, 74B, and the sensed portion 104 is moved into a second position relative to the sensing portion 102. Each rotational position of the shank 50 between the non-tripped and tripped positions may correspond to a different compression distance of the biasing element 74 and thus, a different position of the sensed portion 104 between the first and second positions (FIGS. 5 and 6), which may correspond to a different output voltage.

For instance, in one embodiment, the sensed portion 104 is a bi-polar magnet having a first polar end P1 and a second polar end P2, and the sensing portion 102 is a bi-polar Hall-effect sensor. As such, when the sensed portion 104 is at the first position (FIG. 5) relative to the sensing portion 102, the sensed portion 104 is at a first distance D1 relative to the sensing portion 102, with the second polar end P2 being closer to the sensing portion 102 than the first polar end P1. When the sensed portion 104 is at the second position (FIG. 6) relative to the sensing portion 102, the sensed portion 104 is at a second distance D2 relative to the sensing portion 102, with the first polar end P1 being closer to the sensing portion 102 than the second polar end P2. The sensing portion 102 generates data correlating a first output voltage to the strength of the magnetic field of the second polar end P2 sensed at the first distance D1 and a second output voltage to the strength of the magnetic field of the first polar end P1 sensed at the second distance D2, with the first output voltage being different from the second output voltage. As such, the first output voltage may be associated with the predetermined, non-tripped position of the shank 50, and the second output voltage may be associated with the tripped position of the shank 50. Each rotational position of the shank 50 between the non-tripped and tripped positions may correspond to a different compression distance of the biasing element 74, and thus, a different output voltage between the first and second output voltages.

It should be appreciated that, while the sensing portion 102 is not shown as being received within the biasing element when the shank 50 is at least in the tripped position (FIGS. 4 and 6), the sensing portion 102 may instead be positioned such that it is received within the biasing element 74 for any rotational position of the shank 50 about the first joint 66. It should further be appreciated, that the Hall-effect sensing portion 102 may alternatively be configured as a unipolar Hall-effect sensor positioned such that the sensed portion 104 is at a different distance from the sensing portion 102 for each position between the non-tripped and tripped positions. Additionally, it should be appreciated that the sensing portion 102 may instead be configured as a linear potentiometer, with the sensed portion 104 being an arm coupled between a slider of the potentiometer and the cap 75.

Figure 8:
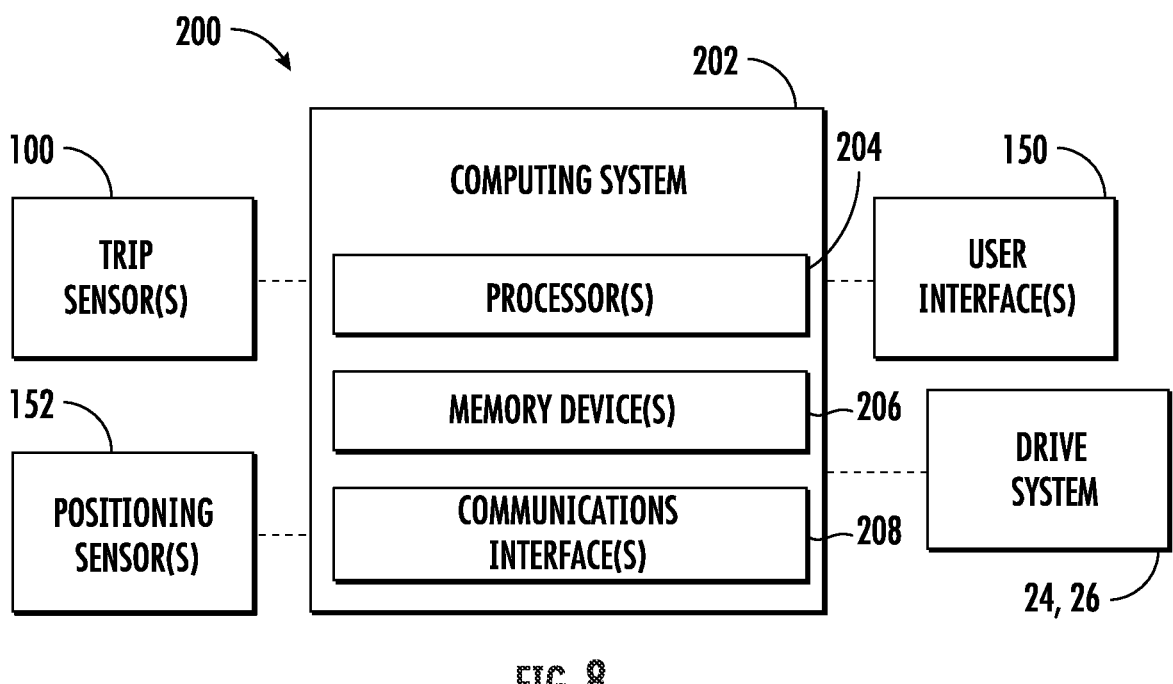
FIG. 8 illustrates a schematic view of a system for determining a trip magnitude of a ground-engaging tool of an agricultural implement in accordance with aspects of the present subject matter.

Referring now to FIG. 8, a schematic view of one embodiment of a system 200 for determining a trip magnitude of a ground-engaging tool of an agricultural implement is illustrated in accordance with aspects of the present subject matter. In general, the system 200 will be described herein with reference to the implement 10 described above with reference to FIGS. 1 and 2, the shank assembly described above with reference to FIGS. 3 and 4, and the trip sensor 100 described above with reference to FIGS. 5-7. However, it should be appreciated that, in general, the disclosed system 200 may be utilized with any suitable implement having any suitable implement configuration to allow the trip magnitude of a ground-engaging tool to be determined, with any other suitable ground-engaging tool, and/or with any other suitable sensor.

As shown in FIG. 8, the system 200 may include a computing system 202 and various other components configured to be communicatively coupled to and/or controlled by the computing system 202. For instance, the computing system 202 may be communicatively coupled to the trip sensor(s) 100 that generates data indicative of a magnitude of rotation of the shanks 50 about the first joint 66. Further, the computing system 202 may be communicatively coupled to and/or configured to control one or more user interfaces 150. The user interface(s) 150 described herein may include, without limitation, any combination of input and/or output devices that allow an operator to provide inputs to the computing system 202 and/or that allow the computing system 202 to provide feedback to the operator, such as a keyboard, keypad, pointing device, buttons, knobs, touch sensitive screen, mobile device, audio input device, audio output device, and/or the like. Moreover, the computing system 202 may be communicatively coupled to one or more positioning sensors 152. Additionally, the computing system 202 may be communicatively coupled to and/or configured to control the drive system (e.g., the engine 24 and/or the transmission 26).

In general, the computing system 202 may comprise any suitable processor-based device known in the art, such as a computing device or any suitable combination of computing devices. Thus, in several embodiments, the computing system 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the computing system 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the pro-cessor(s) 204, configure the computing system 202 to per-form various computer-implemented functions, such as one or more aspects of the methods and algorithms that will be described herein. In addition, the computing system 202 may also include various other suitable components, such as a communications circuit or module, one or more input/output channels, a data/control bus and/or the like.

It should be appreciated that, in several embodiments, the computing system 202 may correspond to an existing com-puting system of the agricultural implement 10 and/or of the work vehicle 12 to which the implement 10 is coupled. However, it should be appreciated that, in other embodi-ments, the computing system 202 may instead correspond to a separate processing device. For instance, in one embodi-ment, the computing system 202 may form all or part of a separate plug-in module that may be installed within the agricultural implement 10 to allow for the disclosed system and method to be implemented without requiring additional software to be uploaded onto existing control devices of the agricultural implement 10.

In some embodiments, the computing system 202 may be configured to include one or more communications modules or interfaces 208 for the computing system 202 to commu-nicate with any of the various system components described herein. For instance, one or more communicative links or interfaces (e.g., one or more data buses) may be provided between the communications interface 208 and the trip sensor(s) 100 to allow the computing system 202 to receive data indicative of a magnitude of rotation of the shank 50 about the first joint 66 from the trip sensor(s) 100. Further, one or more communicative links or interfaces (e.g., one or more data buses) may be provided between the communi-cations interface 208 and one or more user interfaces (e.g., user interface(s) 150) to allow operator inputs to be received by the computing system 202 and/or allow the computing system 202 to control the operation of one or more compo-nents of the user interface(s) 150. Moreover, one or more communicative links or interfaces (e.g., one or more data buses) may be provided between the communications inter-face 208 and the positioning sensors (e.g., positioning sensor(s) 152) to allow location data associated with the specific location at which such data was collected to be received by the computing system 202. Additionally, one or more communicative links or interfaces (e.g., one or more data buses) may be provided between the communications interface 208 and the drive system (e.g., the engine 24 and/or the transmission 26) of the work vehicle 12 to allow the computing system 202 to control the operation of one or more components of the drive system 24, 26.

As indicated above, the computing system 202 may be configured to determine a magnitude of rotation of the shank 50 about the first joint 66 based at least in part on data indicative of the magnitude of rotation of the shank 50 (e.g., output voltage(s)) generated by the trip sensor(s) 100. For example, the computing system 202 may include one or more suitable relationships and/or algorithms stored within its memory 206 that, when executed by the processor 204, allow the computing system 202 to determine the magnitude of rotation of the shank 50. For instance, when the trip sensor(s) 100 are configured to generate an output voltage based at least in part on the position of the sensed portion 104 of the trip sensor 100 relative to the sensing portion 102, the computing system 202 may include pre-defined relation-ships or algorithms used to determine a corresponding rotational position of the shank 50 about the first joint 66 and/or associated depth of the shank 50. Additionally, or alternatively, a look-up table may be generated by or pro-vided to the computing system 202 that correlates output voltages from the trip sensor(s) 100 to the corresponding rotational position and/or associated depth of the shank 50. Such look-up table may be generated, for example, by directly measuring the output voltages in response to known positions of the shank 50 and associated depths for a given position of the implement frame 28 during a testing opera-tion.

Figure 9:
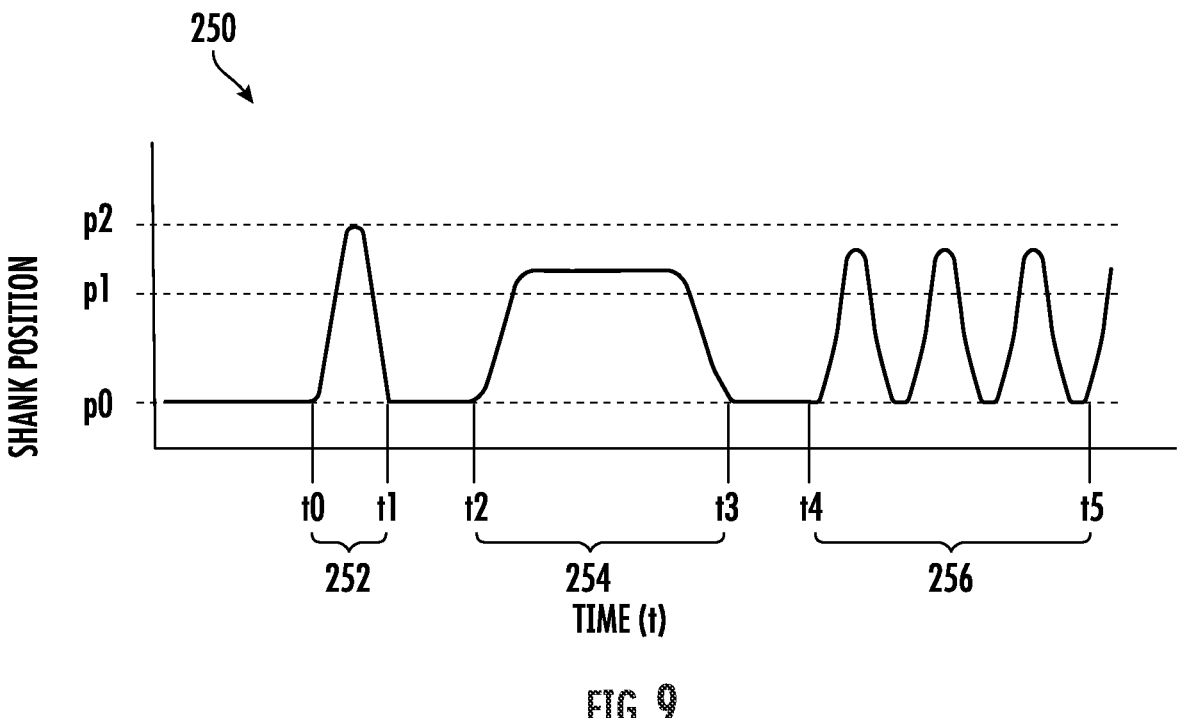
FIG. 9 illustrates a graphical view of an example dataset charting the position of a ground engaging tool over time in accordance with aspects of the present subject matter.

Based at least in part on the magnitude of each trip, the computing system 202 may be further configured to deter-mine a trip event type. For instance, based on the magnitude and duration of each trip, the cause for the trip may be determined. For example, FIG. 9 illustrates a graphical view of an example dataset 250 charting the position (rotation or depth) of a ground engaging tool (e.g., the shank 50) over time in accordance with aspects of the present subject matter. During a first time period 252 between time t0 and time t1, the shank 50 moves from the predetermined ground-engaging tool position p0 toward the tripped rotational position p2 to a position above a threshold position p1 associated with the shank 50 rotating about the first joint 66 by a rotation greater than a magnitude threshold (or a depth less than a depth threshold). The first time period 252 is shorter than a predetermined time threshold, thus, the event during the first time period 252 represents a large trip event of the shank 50, such as when a rock or other impediment is encountered. Similarly, during a second time period 254 between time t2 and time t3, the shank 50 moves from the predetermined ground-engaging tool position p0 toward the tripped rotational position p2 to a position above the thresh-old rotational position p1. However, the second time period 254 is longer than the predetermined time threshold, thus, the event during the second time period 254 represents a float event. During a third time period 256 between time t4 and time t5, a sequential series of rotations of the shank 50 from the predetermined ground-engaging tool position p0 (FIG. 3) to a position above the threshold rotational position p1 occur. The average time for each rotation of the sequen-tial series during third time period 256 is less than the predetermined time threshold, thus, the event during the third time period 256 represents a bad point.

Referring back to FIG. 8, the computing system 202 may be further configured to perform a control action based at least in part on the trip magnitude and/or type of trip event. For instance, when the trip event is a normal trip event, such as shown during the first time period 252 (FIG. 9), the computing system 202 may control an operation of the user interface 150 to indicate the impediment or normal trip event to an operator of the implement 10. When the trip event is a float event, such as shown during the second time period 254 (FIG. 9), the computing system 202 may control an operation of the user interface 150 to indicate or display the float event and/or to request that a ground speed of the implement 10 and/or the work vehicle 12 be reduced. In some instances, the computing system 202 may automatically control one or more components of the drive system (e.g., the engine 24, the transmission 26, and/or the like) of the work vehicle 12 to reduce the ground speed of the implement 10 in response to the float event. When a bad point on the shank 50 is determined, the computing system 202 may control an operation of the user interface 150 to indicate the bad point and/or request that the point be replaced. It should be appreciated that, while not shown, if the shank 50 is not rotated by a magnitude greater than the magnitude threshold or raised to a position above the position associated with the rotation magnitude threshold, the trip may be noted as a minor trip event.

In some embodiments, the computing system 202 may be configured to generate a map correlating a location within a field for each trip of the shank 50. For example, the data generated by the trip sensor 100 may be geo-referenced or may otherwise be stored with corresponding location data received from the positioning sensor(s) 152, which may include a Global Positioning System (GPS) or another similar positioning device(s), configured to transmit a location corresponding to a position of the implement 10 within the field when the data is generated by the trip sensor(s) 100. For instance, the computing system 202 may generate a map (e.g. a heat map) correlating a location within a field to at least one of the magnitude of the rotation of the shank 50 or a depth of the shank 50 associated with the magnitude of the rotation based at least in part on the data generated by the trip sensor 100. In some embodiments, the map may indicate each trip event type and the corresponding location. In one embodiment, the computing system 202 may be further configured to control an operation of the user interface(s) 150 to display the map. The displayed map may be used to determine where rocks or other impediments need to be removed from the field, areas of the field that may need to be reworked, and/or the like.

Referring now to FIG. 10, a flow diagram of one embodiment of a method 300 for determining a trip magnitude of a ground-engaging tool of an agricultural implement is illustrated in accordance with aspects of the present subject matter. In general, the method 300 will be described herein with reference to the implement 10 and the work vehicle 12 shown in FIGS. 1 and 2, the shank assembly described above with reference to FIGS. 3 and 4, the trip sensor 100 described with reference to FIGS. 5-7, and the various components of the system 200 described with reference to FIG. 8-9. However, it should be appreciated that the disclosed method 300 may be implemented with work vehicles and/or implements having any other suitable configurations and/or within systems having any other suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 10, at (302), the method 300 may include receiving data generated by a trip sensor at least partially received within a biasing element configured to bias a ground-engaging tool of an agricultural implement toward a predetermined ground-engaging position, the data being indicative of rotation of the ground-engaging tool. For instance, as discussed above, the computing system 202 may receive data generated by the trip sensor 100 at least partially received within the biasing element 74 configured to bias the shank 50 of the agricultural implement 10 toward a predetermined ground-engaging position (FIG. 3), the data being indicative of rotation of the shank 50 about the first joint 66.

Further, at (304), the method 300 may include determining a magnitude of rotation of the ground-engaging tool based at least in part on the data generated by the trip sensor. For example, as described above, the computing system 202 may use one or more pre-defined relationships, algorithms, look-up tables, and/or the like that correlates the data generated by the trip sensor(s) 100 to the corresponding rotational position and/or associated depth of the shank 50.

Additionally, at (306), the method 300 may include initiating a control action based at least in part on the magnitude of rotation of the ground-engaging tool. For instance, as described above, the computing system 202 may initiate a control action based at least in part on the magnitude of rotation of the ground-engaging tool, such as control an operation of the user interface(s) 150 and/or the drive system 24, 26.

It is to be understood that the steps of the method 300 are performed by the computing system 200 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 200 described herein, such as the method 300, is implemented in software code or instructions which are tangibly stored on a tangible computer readable medium. The computing system 200 loads the software code or instructions via a direct interface with the computer readable medium or via a wired and/or wireless network. Upon loading and executing such software code or instructions by the computing system 200, the computing system 200 may perform any of the functionality of the computing system 200 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for automatically determining a trip magnitude of a ground engaging tool of an agricultural implement, the system comprising:

a ground-engaging system including:

an attachment structure coupled to a frame of an agricultural implement;

a ground-engaging tool rotatably coupled to the attachment structure at a joint;

a biasing element configured to bias the ground-engaging tool towards a predetermined ground-engaging position, the biasing element comprising a coil spring extending longitudinally along a length defined between a first spring end and a second spring end, the length of the coil spring being compressible, a guide extending longitudinally through the coil spring and between a first guide end and a second guide end, the second guide end being rotatably coupled to the attachment structure, the first spring end being positioned proximate the first guide end, and the second spring end being positioned proximate the second guide end; and a cap slidably received on the guide and rotatably coupled to the ground-engaging tool, rotation of the ground-engaging tool sliding the cap along the guide between the first guide end and the second guide end, the first spring end of the coil spring being positioned at the cap;

a trip sensor comprising a first portion and a second portion, the second portion being movable relative to the first portion, the first portion being coupled to the guide and fixed such that the biasing element is longitudinally movable relative to the first portion, the second portion being coupled to the cap and movable with the biasing element, the trip sensor configured to generate data indicative of a magnitude of rotation of the ground-engaging tool based on a position of the second portion of the trip sensor at least partially received within the biasing element; and a computing system communicatively coupled to the trip sensor, the computing system being configured to determine the magnitude of rotation of the ground-engaging tool based at least in part on the data generated by the trip sensor.

2. The system of claim 1, wherein the data generated by the trip sensor is indicative of a compression distance of the biasing element, where the compression distance of the biasing element is indicative of the magnitude of rotation of the ground-engaging tool.

3. The system of claim 1, wherein the data generated by the trip sensor is indicative of a distance the second portion of the trip sensor moves relative to the first portion of the trip sensor, where the distance the second portion of the trip sensor moves is indicative of the magnitude of rotation of the ground-engaging tool.

4. The system of claim 1, wherein the trip sensor comprises a Hall-effect sensor and a magnet, the magnet being the second portion of the trip sensor.

5. The system of claim 1, wherein the trip sensor is a linear potentiometer.

6. The system of claim 1, wherein the computing system is further configured to determine an event type for the rotation of the ground-engaging tool based at least in part on the data generated by the trip sensor.

7. The system of claim 6, wherein:

the event type is a first event type when the magnitude of the rotation of the ground-engaging tool is greater than a magnitude threshold and a duration of the rotation of the ground-engaging tool is less than a time threshold;

the event type is a second event type when the magnitude of the rotation of the ground-engaging tool is greater than the magnitude threshold and the duration of the rotation of the ground-engaging tool is greater than the time threshold; and the event type is a third event type when the rotation of the ground-engaging tool includes a sequential series of rotations of the ground-engaging tool where the magnitude of each of the sequential series of rotations is greater than the magnitude threshold.

8. The system of claim 1, wherein the computing system is further configured to generate a map correlating a location within a field for the rotation of the ground-engaging tool and at least one of the magnitude of the rotation of the ground-engaging tool or a depth of the ground-engaging tool associated with the magnitude of the rotation based at least in part on the data generated by the trip sensor.

9. A shank assembly of an agricultural implement, comprising:

an attachment structure coupled to a frame of the agricultural implement;

a ground-engaging tool rotatably coupled to the attachment structure at a joint;

a biasing element configured to bias the ground-engaging tool towards a predetermined ground-engaging position, the biasing element comprising a coil spring extending longitudinally along a length defined between a first spring end and a second spring end, the length of the coil spring being compressible;

a guide and a cap, the guide extending longitudinally through the coil spring and between a first guide end and a second guide end, the second guide end being rotatably coupled to the attachment structure, the cap being slidably received on the guide and rotatably coupled to the ground-engaging tool, the first spring end of the coil spring being positioned at the cap, the first spring end being positioned proximate the first guide end and the second spring end being positioned proximate the second guide end, rotation of the ground-engaging tool sliding the cap along the guide from the first guide end towards the second guide end;

a trip sensor configured to generate data indicative of a magnitude of rotation of the ground-engaging tool, the trip sensor being at least partially received within the biasing element, the trip sensor comprising a first portion and a second portion that is movable relative to the first portion, the second portion being movable with the biasing element, the first portion of the trip sensor being fixedly coupled to the guide and the second portion of the trip sensor being coupled to the cap; and a computing system communicatively coupled to the trip sensor, the computing system being configured to determine the magnitude of rotation of the ground-engaging tool based at least in part on the data generated by the trip sensor.

10. A method for determining a trip magnitude of a ground engaging tool of a ground-engaging system of an agricultural implement, the ground-engaging system including an attachment structure coupled to a frame of the agricultural implement, a ground-engaging tool rotatably coupled to the attachment structure at a joint, a biasing element configured to bias the ground-engaging tool towards a predetermined ground-engaging position, the biasing element comprising a coil spring extending longitudinally along a length defined between a first spring end and a second spring end, the length of the coil spring being compressible, the ground-engaging system further including a guide and a cap, the guide extending longitudinally through the coil spring and between a first guide end and a second guide end, the second guide end being rotatably coupled to the attachment structure, the first spring end being positioned proximate the first guide end and the second spring end being positioned proximate the second guide end, the cap being slidably received on the guide and rotatably coupled to the ground-engaging tool, the first spring end of the coil spring being positioned at the cap, rotation of the ground-engaging tool sliding the cap along the guide between the first guide end and the second guide end, the method comprising:

receiving, with a computing system, data generated by a trip sensor, the trip sensor comprising a first portion and a second portion, the second portion being movable relative to the first portion, the first portion being coupled to the guide and fixed such that the biasing element is longitudinally movable relative to the first portion, the second portion being coupled to the cap, the second portion being movable with the biasing element, the data being indicative of a magnitude of rotation of the ground-engaging tool, the data being generated based on a position of the second portion of the trip sensor at least partially received within the biasing element;

determining, with the computing system, a magnitude of rotation of the ground-engaging tool based at least in part on the data generated by the trip sensor; and initiating, with the computing system, a control action based at least in part on the magnitude of the rotation of the ground-engaging tool.

11. The method of claim 10, wherein the data generated by the trip sensor is indicative of a compression distance of the biasing element, where the compression distance of the biasing element is indicative of the magnitude of rotation of the ground-engaging tool.

12. The method of claim 10, wherein the data generated by the trip sensor is indicative of a distance the second portion of the trip sensor moves relative to the first portion of the trip sensor, where the distance the second portion of the trip sensor moves is indicative of the magnitude of rotation of the ground-engaging tool.

13. The method of claim 10, wherein the trip sensor comprises a Hall-effect sensor and a magnet.

14. The method of claim 10, wherein the trip sensor is a linear potentiometer.

15. The method of claim 10, wherein the control action comprises:

determining, with the computing system, an event type for the rotation of the ground-engaging tool based at least in part on the data generated by the trip sensor; and controlling, with the computing system, an operation of a user interface to display the event type.

16. The method of claim 15, wherein:

the event type is a first event type when the magnitude of the rotation of the ground-engaging tool is greater than a magnitude threshold and a duration of the rotation of the ground-engaging tool is less than a time threshold;

the event type is a second event type when the magnitude of the rotation of the ground-engaging tool is greater than the magnitude threshold and the duration of the rotation of the ground-engaging tool is greater than the time threshold; and the event type is a third event type when the rotation of the ground-engaging tool includes a sequential series of rotations of the ground-engaging tool where the magnitude of each of the sequential series of rotations is greater than the magnitude threshold.

17. The method of claim 10, wherein the control action comprises:

generating, with the computing system, a map correlating a location within a field for the rotation of the ground-engaging tool and at least one of the magnitude of the rotation of the ground-engaging tool or a depth of the ground-engaging tool associated with the magnitude of the rotation based at least in part on the data generated by the trip sensor; and controlling, with the computing system, an operation of a user interface to display the map.

* * * * *